Dec. 19, 1933. F. F. PAZZANO Re. 19,027

TOOL

Original Filed Dec. 29, 1930 2 Sheets-Sheet 1

Inventor:
Frederick F. Pazzano,
by Emery, Booth, Varney and Townsend
Attys

Dec. 19, 1933. F. F. PAZZANO Re. 19,027

TOOL

Original Filed Dec. 29, 1930 2 Sheets-Sheet 2

Inventor:
Frederick F. Pazzano
by Emery, Booth, Varney & Townsend
Attys

Reissued Dec. 19, 1933

Re. 19,027

UNITED STATES PATENT OFFICE 19,027

TOOL

Frederick F. Pazzano, Waltham, Mass.

Original No. 1,898,568, dated February 21, 1933, Serial No. 505,436, December 29, 1930. Application for reissue August 18, 1933. Serial No. 685,785

2 Claims. (Cl. 7—3)

This invention relates to certain new and useful improvements in tools, and the primary object of the present invention is to provide a tool especially adapted for the removal of automobile storage battery terminal clips, the object of the invention being to provide a tool equipped with a pair of jaws for loosening and tightening the clip nut, and for lifting or removing the clip, together with additional means adapted to be inserted in the confine of the clip for spreading the same to facilitate removal of the clip from the storage battery terminal.

A further object of the invention is to provide a tool of this character, which is comparatively simple in construction, consists of relatively few parts, and which will be found thoroughly efficient for the purpose designed.

Other objects and advantages of the invention will become apparent during a study of the following description, taken in connection with the accompanying drawings wherein.

Figure 1:
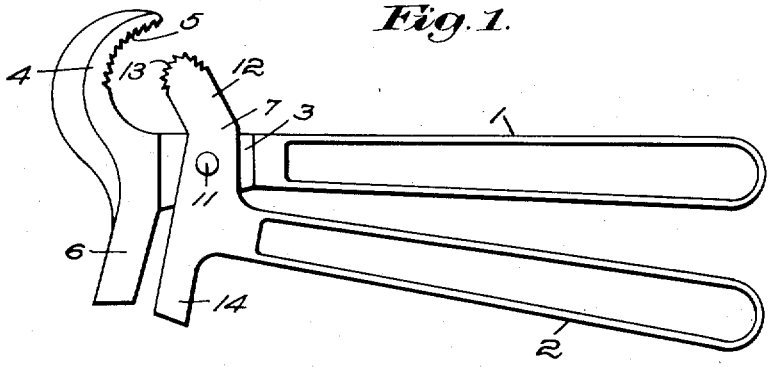
Fig. 1 is a side elevational view of the tool.
Figure 2:
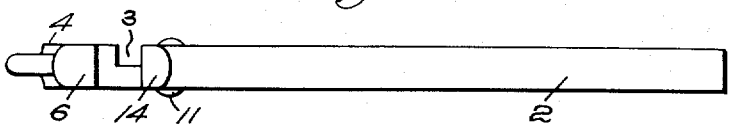
Fig. 2 is a bottom plan view thereof.
Figure 3:
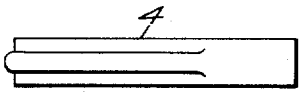
Fig. 3 is an edge elevational view of one of the jaws.
Figure 4:
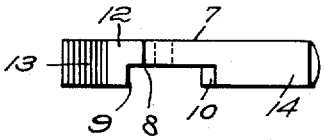
Fig. 4 is an elevational view of the other of the jaws.

With reference more in detail to the drawings, it will be seen that the tool comprises a pair of levers 1 and 2 respectively, each comprising a handle member at one end and an opposite end or head portion. The lever 1, hereinafter termed the longer or outer lever, adjacent one end thereof, namely, upon its head portion, is provided with a seat or lateral notch 3, and at the forward end of the notch has projecting laterally therefrom an arcuate jaw 4 having a concaved work-engaging face provided with teeth 5, said jaw as illustrated having a relatively narrow or thinly tapered outer end. Extending laterally from the lever 1 in a direction opposite to the toothed jaw 4 is an integral lug or work-spreading finger 6, preferably disposed obliquely with respect to the longitudinal axes of the lever 1.

The lever 2, hereinafter referred to as the shorter or inner lever, has at one end, namely, upon its head portion, a lateral projection 7 which may be provided on one side thereof with a notch or seat 8 defined by upper and lower shoulders 9 and 10. This projection 7 is pivoted at its seat 8 upon the seat 3 or notch of the other lever, substantially centrally of said seats, through the medium of a suitable pivot pin 11.

The projection 7 of the inner lever 2 at its free end terminates in a jaw 12, which jaw 12 is in the same or substantially the same plane, transversely of the pivot, as the jaw 4. Said jaw 12 has at least an outer portion of its free end non-concave, preferably convex, and at its free end is provided with a series of teeth 13, illustrated as arcuate, for cooperation with the teeth 5.

Projecting laterally from the lever 2 oppositely with respect to the projection 7 is a work-spreading finger or lug 14 cooperable with the lug 6, for the purposes previously and hereinafter indicated.

Figure 5:
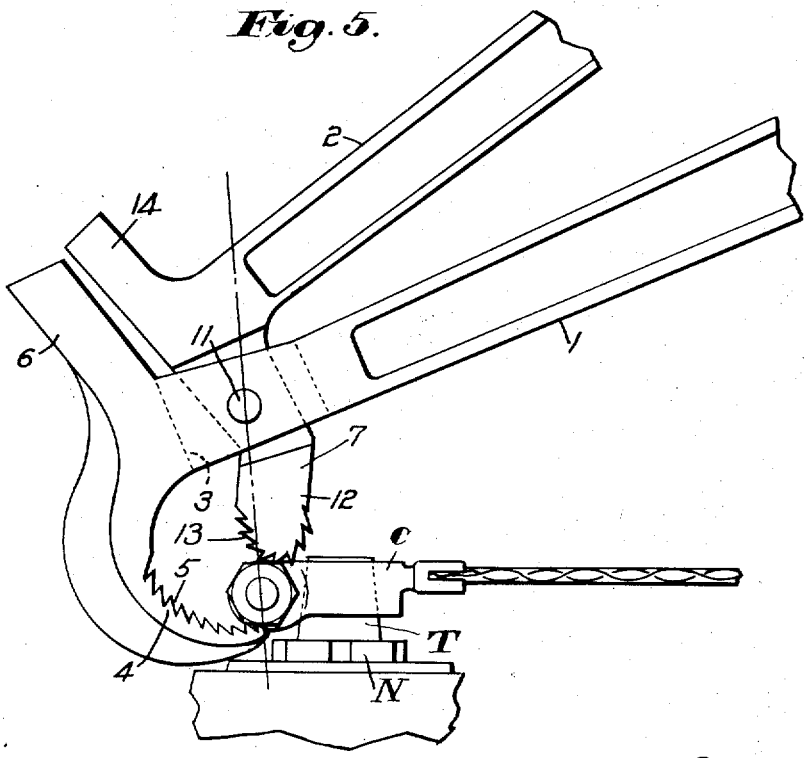
Fig. 5 is partial side elevation of the tool, upon a larger scale, illustrating its use in manipulating a nut of a storage battery terminal clip.
Figure 6:
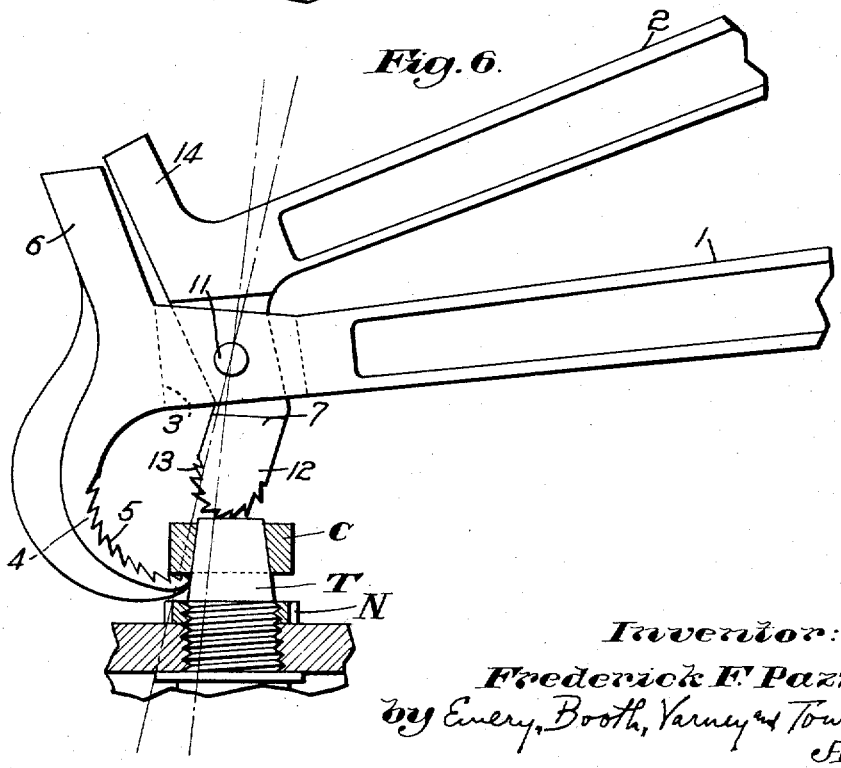
Fig. 6 is a similar view as Fig. 5, but showing the tool in use for automatically loosening or lifting off a terminal clip from a storage battery terminal.

It will be noted, referring particularly to Figs. 1, 5 and 6, that the head portions of the levers are of different extents, beyond the pivot point 11, that of the outer lever 1 extending substantially beyond that of the other or inner lever 2, in the direction of the lever axes. It is also of particular note that the toothed jaws 4 and 12 both project laterally upon the same side of the pivot point, and that one of them, herein the jaw 12 of the inner lever 2, is shorter than the other, herein the jaw 4, and that a portion of the toothed work-engaging face 13 of the shorter jaw 12 is operatively positionable radially opposite the work-engaging face 5 of the jaw 4, with reference to the pivot point. In other words, the inner jaw 12 through at least the major range of its operative positions lies radially within or in radial opposition to an enclosing arcuate portion of the outer jaw 4, so that radial lines extended out through the toothed work engaging face 13 of the inner jaw intersect the arcuate toothed face 5 of the outer jaw at circumferentially spaced points.

In actual practice and when using the tool for loosening or tightening the nut of a storage battery terminal, the jaws 4 and 12 are moved into engagement with the nut by moving the levers 1 and 2 toward one another, and then by suitably manipulating the tool the nut may be threaded relative to its bolt for loosening or tightening the nut as desired. This operation is illustrated in Fig. 5, showing the tool as applied to the clip nut N of a standard or usual storage battery terminal unit, which includes the terminal T and the clip C set on it. The space between the nut and the battery cover is vertically limited, but the thin end of the jaw 4 is operatively receivable within that limited space, in opposition to the face 12 of the other jaw, radially of the pivot 11.

Another important function of the tool is that of automatically loosening and lifting a terminal clip, in the manner illustrated in Fig. 6. For this purpose the shorter and substantially radial jaw 12 of the inner lever 2 is set on the top face of the battery terminal T, while the end of the outer jaw 4 is inserted below the clip C, so that operative portions of said jaws are substantially in radial opposition with respect to the tool pivot. Down pressure is maintained on the radial jaw 12, which serves in the manner of a fixed fulcrum, and closing pressure applied to the levers exerts a strong upwardly acting component on the jaw 4, substantially radially of and toward the pivot 11. The clip C accordingly is loosened and actually lifted up off of its seat on the battery terminal T. Clips such as C are thus readily loosened or removed, automatically, despite their frequent corrosion and tight wedging upon the terminals, making them otherwise difficult to take off. The radial or substantially radially opposed cooperation of the jaws, or the radial force component, may readily be visualized by reference to the dot and dash lines in Figs. 5 and 6.

To use the tool for spreading the clip of the battery terminal, levers 1 and 2 are moved away from one another for positioning the lugs 6 and 14 adjacent one another, and the lugs may be then inserted within the confines of the clip, one face of each lug 6 and 14 being suitably rounded conformably to engage a portion of the clip. While moving the levers 1 and 2 toward one another for spreading the lugs 6 and 14 apart the terminal clip will be "spread" or "expanded" thus facilitating removal of the clip from about the battery terminal, or preparing it for positioning upon such terminal. In their closed condition said lugs may also be utilized as a reamer or cleaner for the battery-terminal recess of the clip. Portions of the levers adjacent the pivot may also be used for wedging open the clip, one of the levers being inserted within the clip, opposite the split portion thereof, and the two levers being then forced together between the split ends of the clip, spreading the latter. The handle members of the levers need not be straight, as illustrated, and may also serve as a battery carrier or handle.

The tool of my invention, as herein illustrated by way of example, is additionally useful for tightening or loosening battery post or terminal nuts, such as indicated at N in Figs. 5 and 6, particularly when the clip or connector as shown at C is in position upon the terminal. Such terminal or post nuts N are generally of the flat character illustrated and the clips set down upon the terminal relatively closely to the nuts, affording but limited working space for access to the nuts. It will be noted in this connection that the work-engaging jaws of my tool as shown are desirably relatively thin and flat, being thus constructed and arranged for application to the battery terminal nuts N and for operative manipulation within the limited space referred to.

It is thought that from the foregoing description taken in connection with the drawings a clear understanding of the operation, construction, utility and advantages of a tool of this character will be had by those skilled in the art without a more detailed description.

It is to be understood while I have herein shown and described a preferred embodiment of the invention, that the same is susceptible of modifications, improvements and variations coming within the scope of the appended claims.

Having thus described my invention what I claim as new is:

1. A combination tool comprising in combination a pair of pivotally mounted levers, provided at their corresponding ends with cooperating work spreading fingers, one of said handle members having a transverse slot and the other of said handle members having a lateral projection operable within the slot, and terminating at its free end in a portion inclined to the axes of the handle members and provided with a convex toothed work engaging face, and said first-mentioned handle member adjacent the slot provided with a lateral projection having a concave toothed work engaging face confronting the work engaging face of said inclined portion, and said work spreading fingers confronting one another and adapted to engage one with the other when the handle members are spread apart to thereby limit relative swinging movement of the handle members.

2. A combination tool comprising in combination a pair of pivoted levers, corresponding ends of said levers being formed as handle members and said levers having head portions at their other ends, the head portion of each lever including a transverse positioning seat and pivot mounting for the other lever, a work-spreading finger projecting at one side of said seat angularly with respect to the lever axis, and also including a laterally projecting jaw at the opposite side of said seat having a toothed work-engaging face, said toothed work-engaging faces of the levers confronting one another, one of them being concave and having its outer end portion operatively positionable substantially in opposition to the outer end of the corresponding lateral jaw of the other lever, said work-spreading fingers also confronting one another, and said levers having parts adapted to engage one with the other when the handle members are spread thereby to limit relative swinging movement of the handle members, the latter operative by movement toward each other as common means to spread said work-spreading fingers and to move the toothed work-engaging faces toward each other.

FREDERICK F. PAZZANO.